United States Patent [19]
Sodo

[11] Patent Number: 5,704,679
[45] Date of Patent: Jan. 6, 1998

[54] RETRACTABLE WINDSHIELD

[76] Inventor: Diego Sodo, Via Tasso, 480 - Palazzina Eldorado, 80126 Napoli, Italy

[21] Appl. No.: 378,428

[22] Filed: Jan. 26, 1995

[30] Foreign Application Priority Data

Feb. 2, 1994 [IT] Italy ................. BO94A0041

[51] Int. Cl.⁶ .................................................. B62J 17/04
[52] U.S. Cl. .................. 296/78.1; 296/89; 296/96.21
[58] Field of Search ................ 296/78.1, 89, 190, 296/96.21, 84.1

[56] References Cited

U.S. PATENT DOCUMENTS

| | | | |
|---|---|---|---|
| 1,519,194 | 12/1924 | Ellery | 296/89 X |
| 2,237,594 | 4/1941 | Dunlap | 296/78.1 |
| 4,353,590 | 10/1982 | Wei-Chuan | 296/78.1 |
| 4,355,838 | 10/1982 | Hickman | 296/78.1 |
| 4,606,571 | 8/1986 | Fujita | 296/78.1 X |
| 4,696,509 | 9/1987 | Yagasaki et al. | 296/78.1 X |
| 4,707,017 | 11/1987 | Minobe et al. | 296/78.1 X |
| 4,830,423 | 5/1989 | Nebu et al. | 296/78.1 |
| 5,468,042 | 11/1995 | Heinrichs et al. | 296/146.4 |

FOREIGN PATENT DOCUMENTS 3700761  7/1987  Germany.

*Primary Examiner*—David M. Mitchell
*Assistant Examiner*—Kia M. Robinson
*Attorney, Agent, or Firm*—Guido Modiano; Albert Josif

[57] ABSTRACT

A retractable windshield for a scooter, in which an elongated compartment is formed between the front fairing and the sleeve of the fork of the scooter; the windshield can be inserted in the compartment by sliding longitudinally, and in front of the sleeve of the fork there are elements for guiding and locking the windshield in the lowered inactive condition and in the active raised condition.

9 Claims, 10 Drawing Sheets

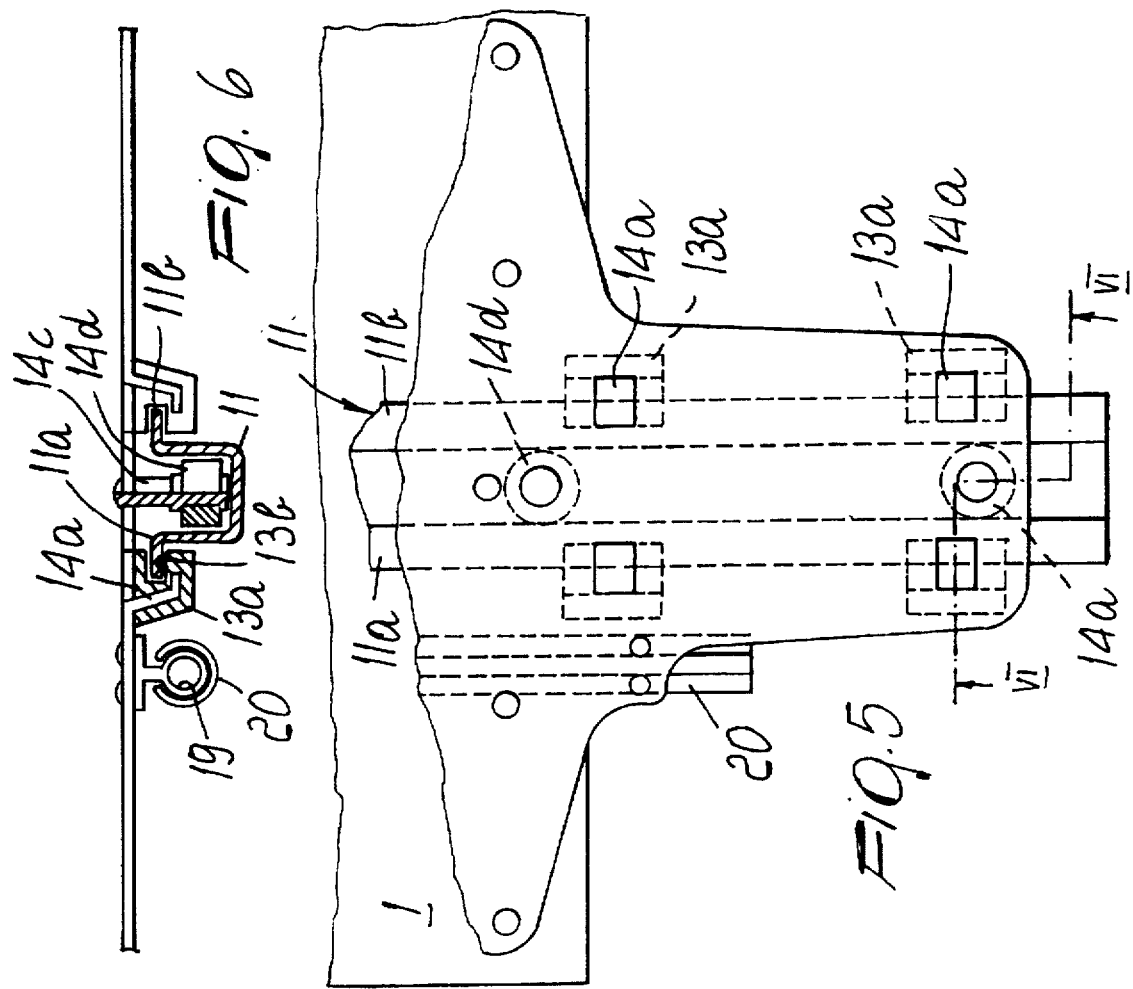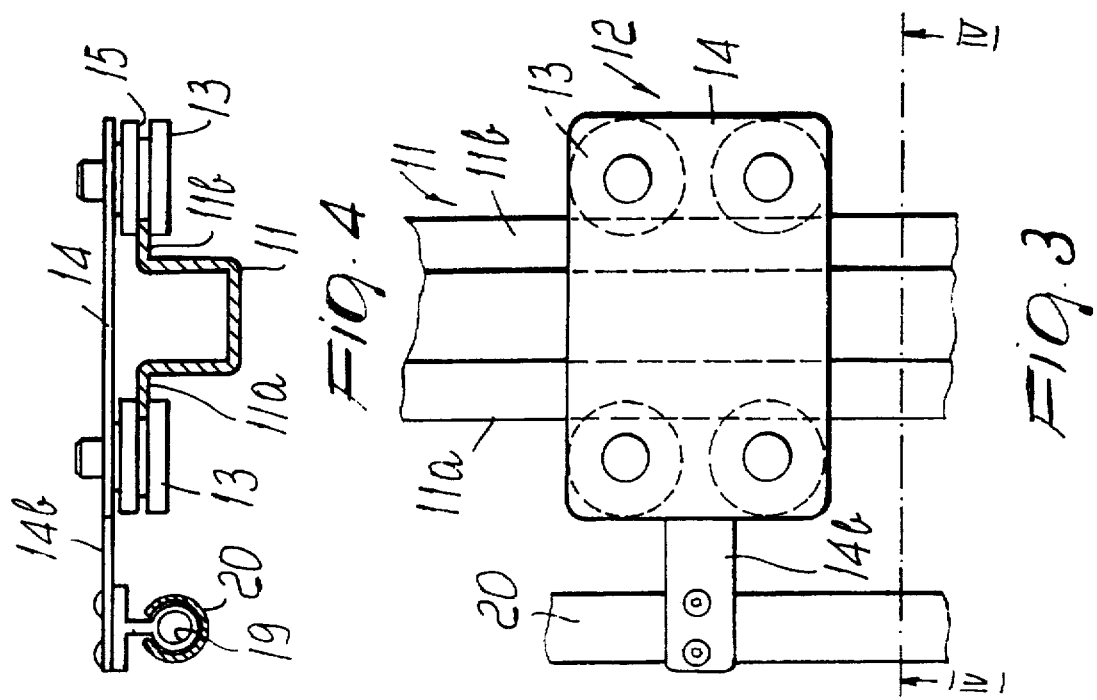

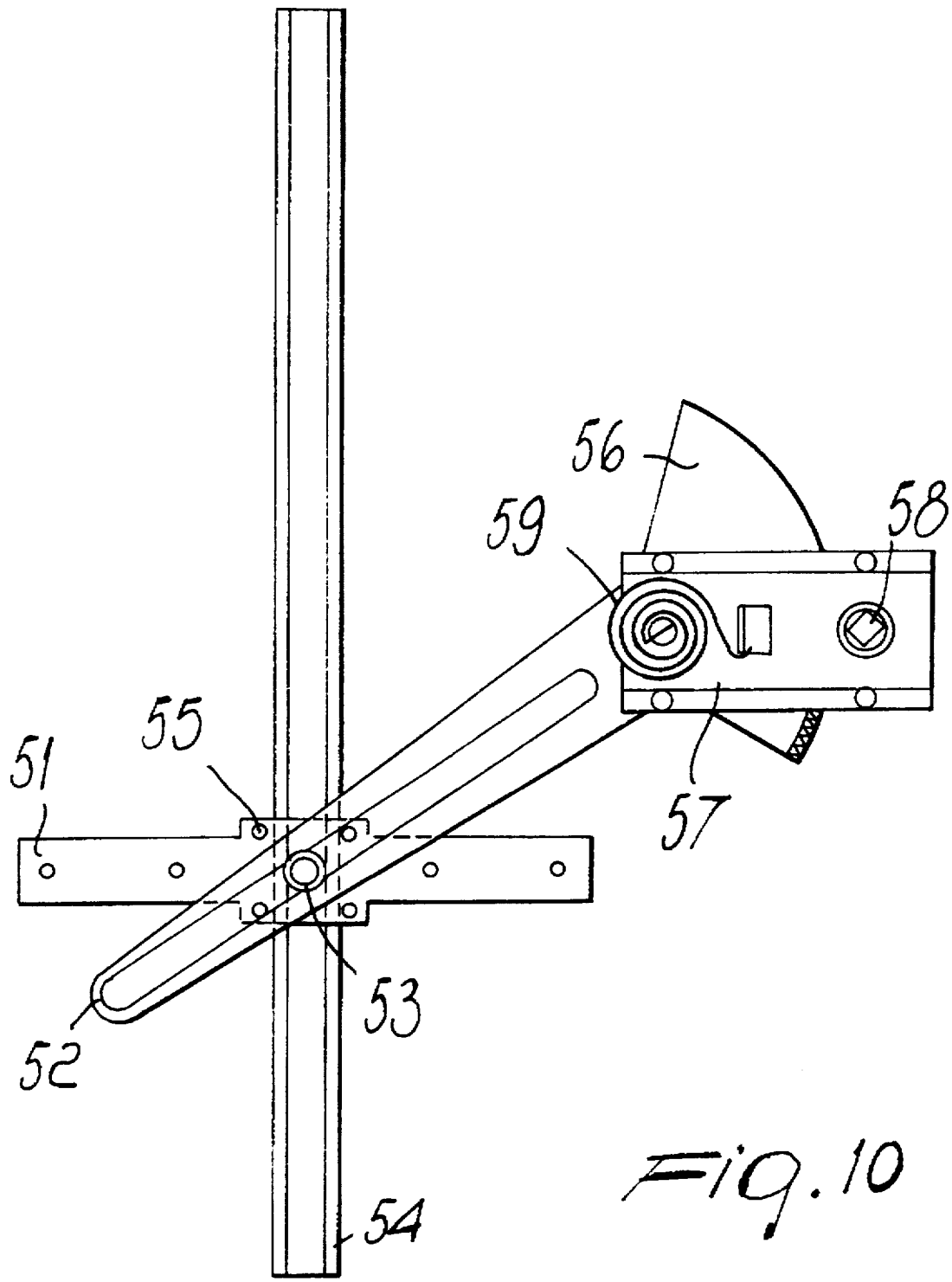

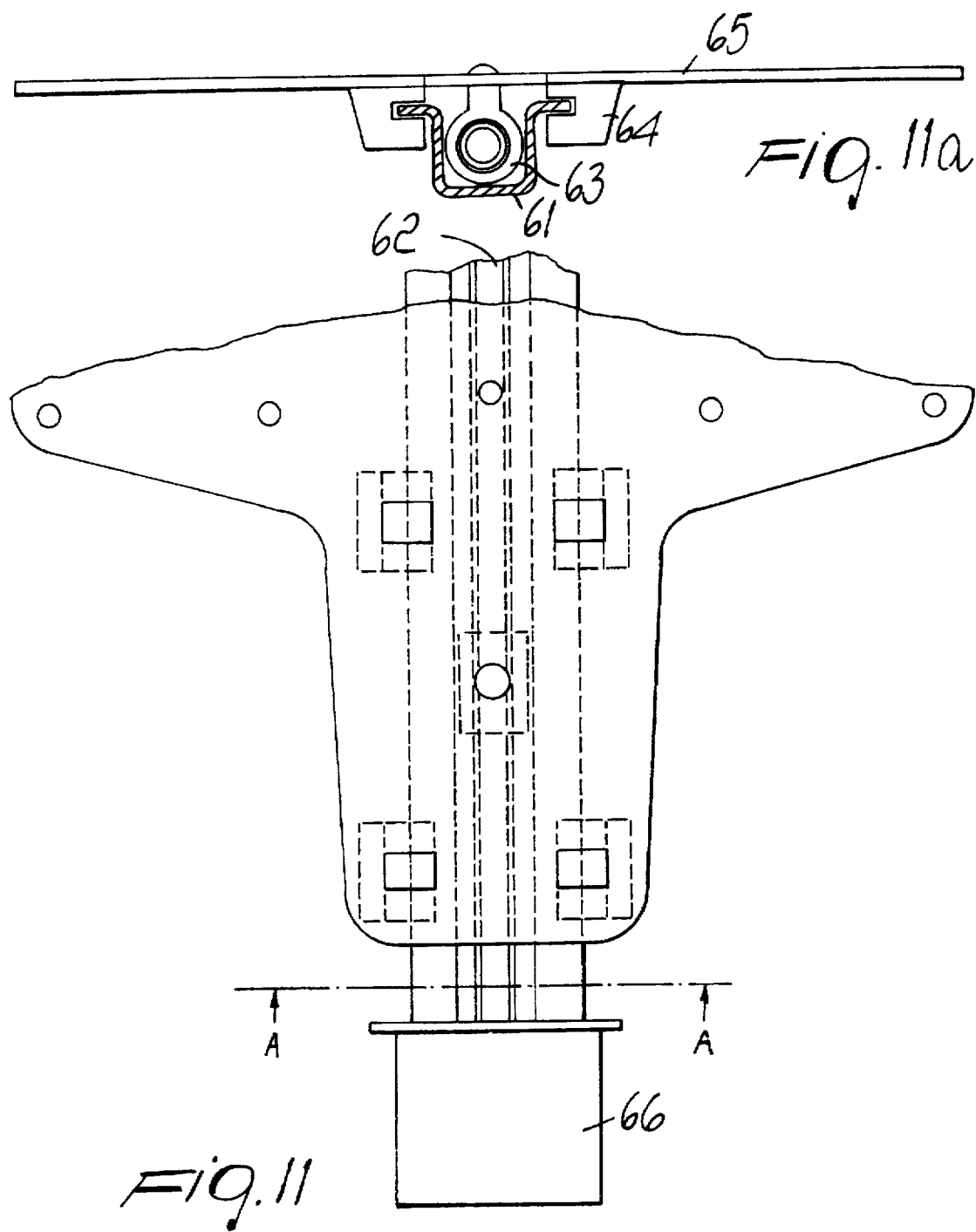

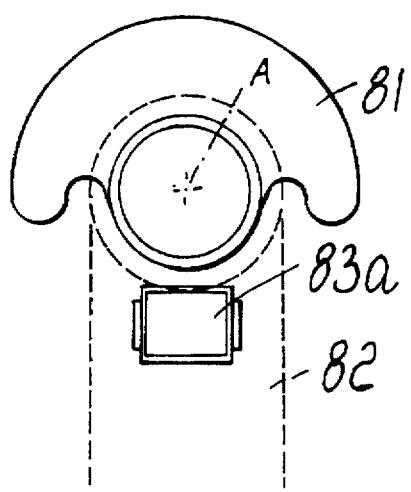 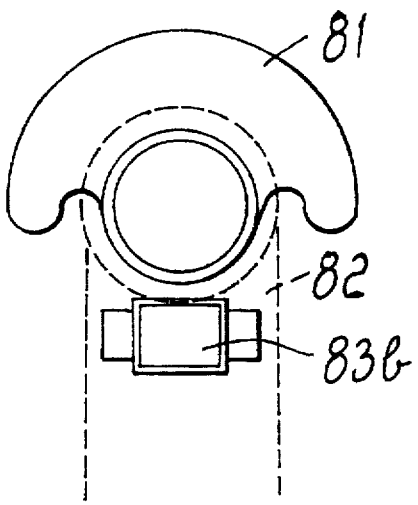
Fig. 13a    Fig. 13b
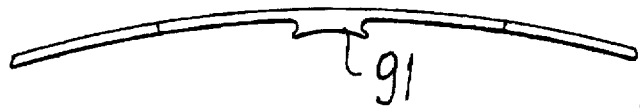
Fig. 14a
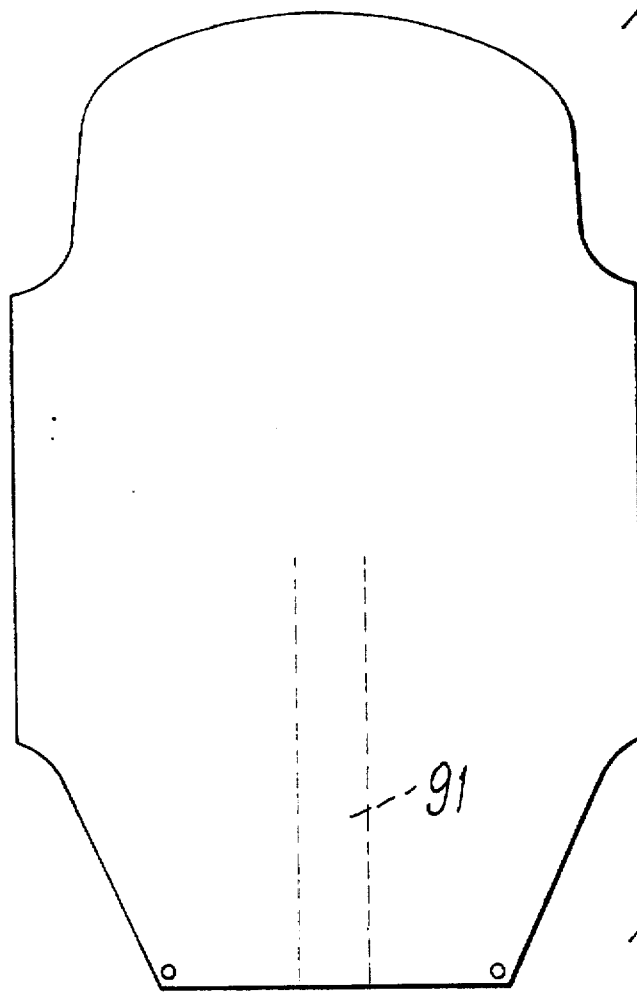
Fig. 14

RETRACTABLE WINDSHIELD

BACKGROUND OF THE INVENTION

The present invention relates to a retractable windshield, particularly for a scooter, that is to say for a moped having small-diameter wheels or even for motorcycles of any kind, including three-wheelers.

Rather bulky windshields that can be applied to scooters and are installed and removed as needed are known: a great drawback of these accessories is that installing and removing them requires a rather long intervention time and the use of special tools; accordingly, they are installed and removed seasonally, and the user may thus happen to have no windshield when he needs it or have the windshield installed when he would appreciate being able to move more easily and freely without it.

SUMMARY OF THE INVENTION

A principal aim of the present invention is to obviate the mentioned drawbacks of known windshields, that is to say, to provide a retractable windshield for scooter that can be easily installed and removed when it is to be used in a very short time and without requiring particular tools.

An object of the present invention is to provide a retractable windshield for scooters that can be kept with the scooter at all times to be transferred in any moment from the inactive configuration to the active configuration and vice versa.

Another object of the present invention is to achieve the above aim and object with a structure that is simple, relatively easy to produce in practice, safe in use, effective in operation, and has a relatively low cost.

According to the present invention, there is provided a retractable windshield, particularly for a scooter, which is characterized in that an elongated compartment is formed between the front fairing and the sleeve of the fork of the scooter, the windshield being insertable in said compartment by sliding longitudinally, and in that in front of the sleeve of the fork there are means for guiding and locking the windshield in the lowered inactive condition and in the active raised condition.

BRIEF DESCRIPTION OF THE DRAWINGS

The particular technical characteristics and advantages of the present invention will become apparent and evident from the following detailed description of a preferred but not exclusive embodiment thereof, illustrated only by way of non-limitative example in the accompanying drawings, wherein:

FIG. 3 is a front view of a detail of FIG. 2;

FIG. 4 is a sectional view, taken along the plane IV—IV of FIG. 3;

FIG. 5 is a front view of another intended embodiment of the detail of FIG. 3;

FIG. 6 is a sectional view, taken along the plane VI—VI of FIG. 5; FIGS. 7 and 8 are perspective views of the front part of a scooter with the windshield in lowered configuration and in raised configuration respectively;

FIG. 10 shows a motorization assembly with caliper arms;

FIG. 11 shows a motorization assembly with female threads and a worm screw;

FIG. 11a is a sectional view taken along the plane A—A of FIG. 11;

FIG. 13a and 13b show a safety system for limiting the steering angle if the windshield is so close to the handlebar as to prevent full steering;

FIG. 14 shows a windshield reinforced with a single central rib;

DESCRIPTION OF THE PREFERRED EMBODIMENTS

Figure 1:
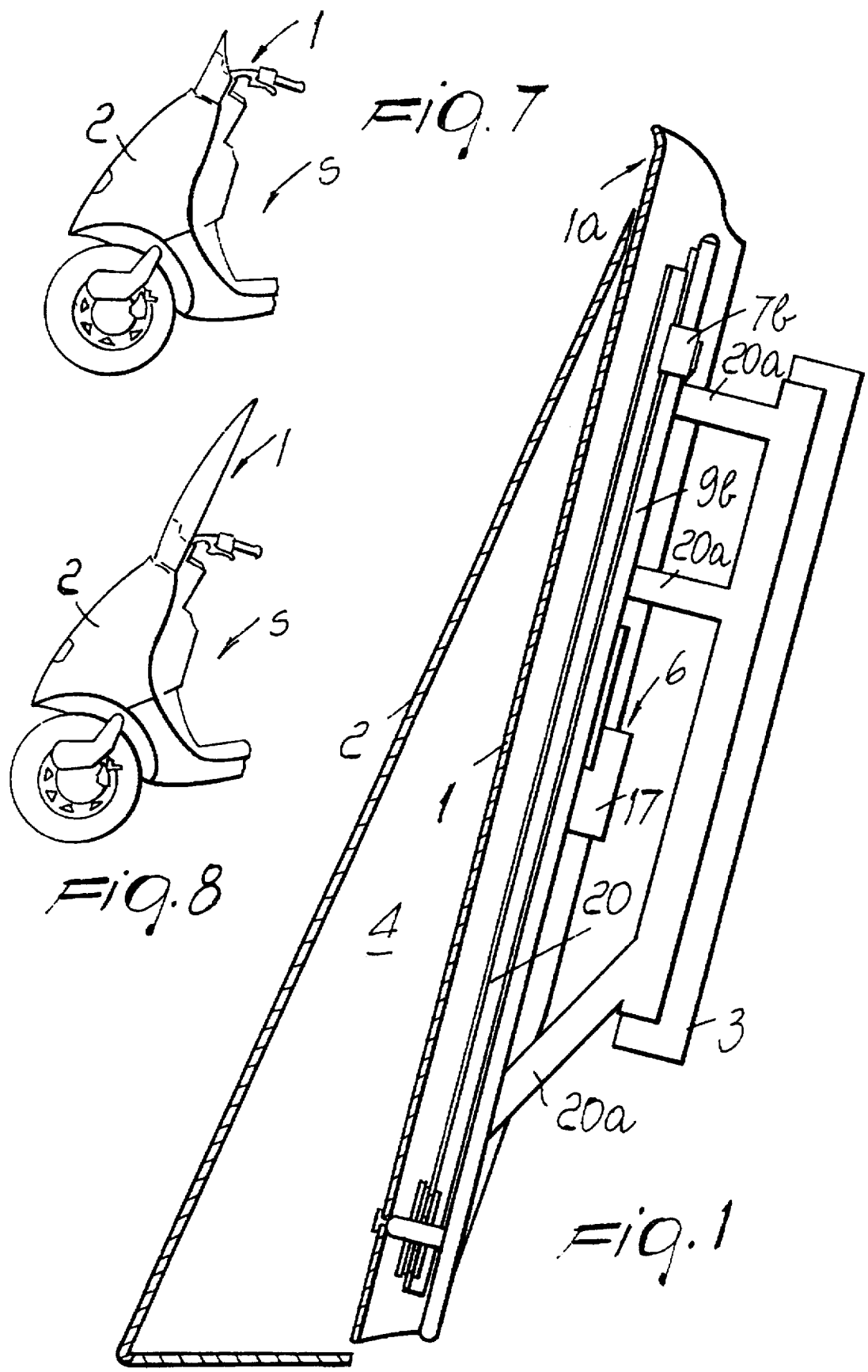
FIG. 1 is a schematic side view of a retractable windshield according to the invention.

With particular reference to the above Figures, the reference numeral 1 generally designates a retractable windshield for a scooter 5 according to the invention.

The reference numeral 2 designates the front fairing and the reference numeral 3 designates the sleeve of the fork of a scooter; an elongated compartment 4 is formed between said fairing and said sleeve, and the windshield 1 is slideable therein.

Means 5 and 6 for guiding and locking the windshield in the lowered inactive configuration and in the raised active configuration are provided in front of the sleeve of the fork.

The windshield is advantageously made of a transparent material such as for example polymethylmethacrylate, polycarbonate, or other material, and is substantially shaped like a longitudinally elongated cylindrical sector; the upper edge of the windshield can advantageously have a small forward curl 1a that enhances driver protection.

The guiding means 5 comprise two contoured bushes 7a and 7b which are fixed to the ends of two fork-like arms 8a and 8b which are in turn fixed to the sleeve of the fork; longitudinal profiles 9a, 9b rigidly coupled to the windshield are slidably inserted on said arms, and in the particular case shown in the FIG., the profiles 9 are constituted by two circular cross-section metal stems which are fixed, at their ends, to feet 10 fixed to the windshield and which can be moved towards the central axis of the windshield, as seen in the FIG., or which can be positioned adjacent to the lateral edges of the windshield: accordingly, the bushes 7 advantageously have a cylindrical cross-section and are made of a material of the type known by the trade-name Nylon: however, it is possible to provide the profiles 9 monolithically with the windshield, and in this case said profiles may have a T-shaped or omega-shaped cross-section and the bushes may assume a shape and a cross-section that are complementary to the profiles.

The guiding means 5 also comprise a rail 11 which has a preferably omega-shaped cross-section and is rigidly coupled to the sleeve; a carriage 12 is movable along said rail, is firmly fixed to the lower part of the windshield, and is provided with low-friction sliding means which may be for example idle wheels 13; the carriage can be advantageously constituted by a substantially rectangular plate 14 on the corners whereof the four wheels 13 are freely mounted, said wheels having respective grooves 15 in which the lateral wings 11a, 11b of the rail 11 fit; two mirror-symmetrical lateral arms 16a, 16b extend downwardly from the plate 14 and are fixed to the lower feet 10 that fix the stems 9 (embodiment shown in FIGS. 1, 2, 3, and 4).

Figure 2:
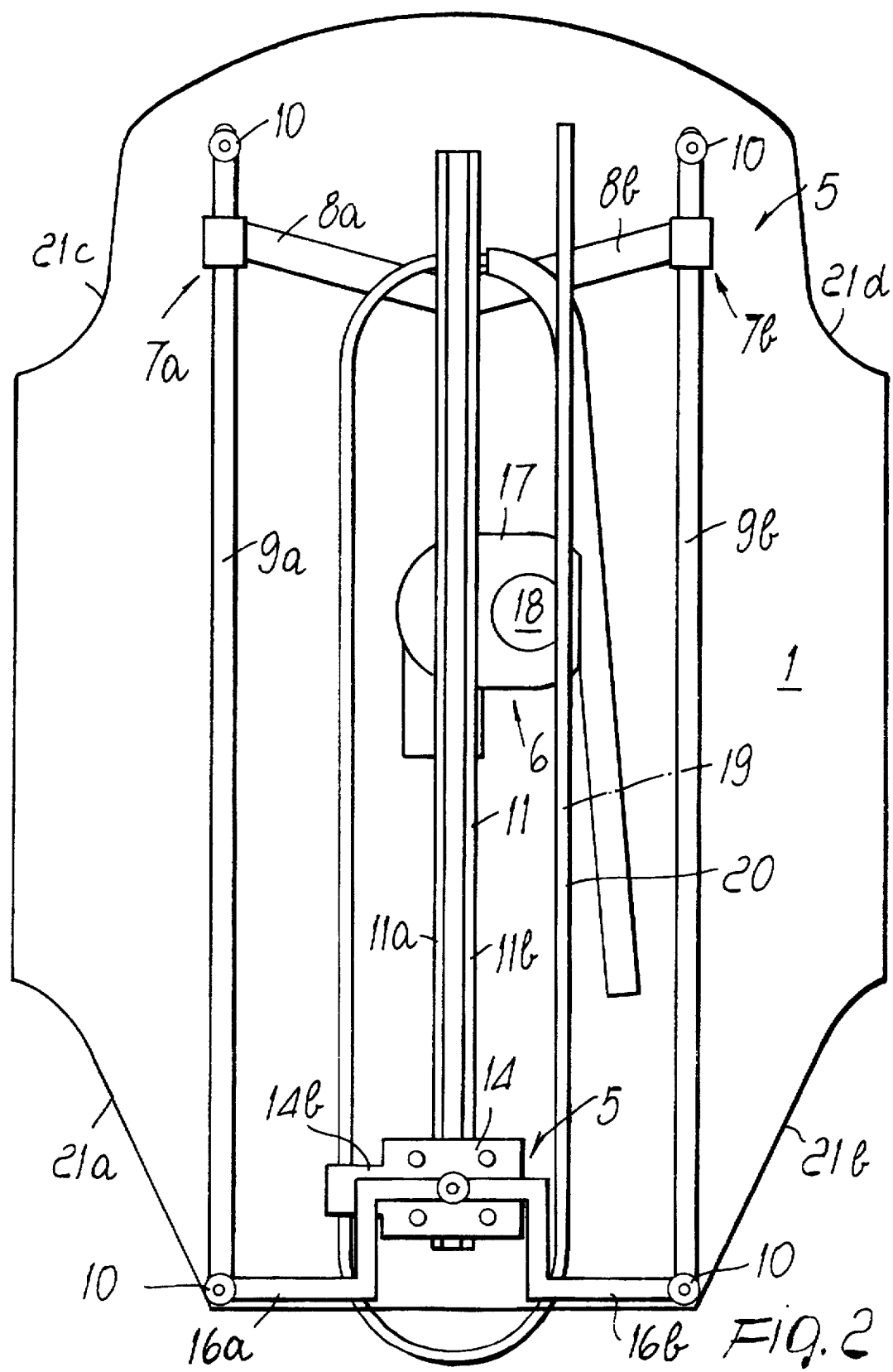
FIG. 2 is a schematic front view of the windshield of FIG. 1.

As can be seen in FIG. 2, the carriage 12 is connected adjacent one end of the windshield 1 and the longitudinal profiles 9a, 9b are connected to the windshield 1 so as to extend from said one end to an opposite end of the windshield 1. Moreover, the central rail 11 has an extension substantially as large as the extension of said longitudinal profiles 9a, 9b.

In another intended embodiment, shown in FIGS. 5 and 6, the free wheels are replaced by sliders 13a made of a material such as plastics, which have respective contoured slots 13b in which the lateral wings 11a, 11b of the rail 11 fit: the reference numeral 14a designates cut and folded lugs of the plate 14 over which the sliders 13a are embedded: in order to keep the carriage 12 better guided, one or more idle wheels 14d are centrally fixed to the plate 14 by means of respective pivots 14c; said wheels 14d fit in the slot of the rail 11 which, in this intended embodiment, can extend downwardly even below the level of the top of the fork of the scooter.

In order to provide effective wind resistance, when the windshield is fully raised the bushes 7a and 7b should conveniently be spaced vertically as much as possible from the wheels or sliders 13, 13a: accordingly, the carriage 12 extends downwardly with wheels or sliders that reach below the lower edge of the windshield, as in the embodiment shown in FIGS. 5 and 6, to couple to said rail 11. With such an extension, a perceptable downward shift of the point of reaction of the structure is obtained in contrast to the wind thrust thereby developing a lever effect which is more advantageously felt the more the sliders 13a and the wheel 14d are downwardly moved.

An electric motorization assembly 17 for raising and lowering the windshield is fixed to the sleeve of the fork and is also suitable to act as a means for locking the windshield, mainly in the raised configuration.

In the particular case shown in the FIG., the assembly 17 is of the type that includes a motor and a reduction unit, used to raise and lower windows in a motor vehicle, and is rigidly coupled to the rail 11; the reference numeral 18 designates a sprocket which is associated with the output shaft of the assembly 17 and is suitable to cooperate with a helical spring 19 that acts as a flexible rack, has one end fixed to a lateral flap 14b of the plate 14, and is mounted in a frame 20 which has a tubular cross-section and is shaped like a rectangle with semicircular upper and lower short sides; said frame is fixed in a forward position to the sleeve of the fork, together with the rail 11 and the assembly 17, by means of arms 20a which are welded to a half-tube 20b; the described motorization assembly is of a known type and can be replaced with motion transmission assemblies having a cable which is closed in a loop, with assemblies having a rack-and-pinion system, and with other assemblies.

The windshield might be raised and lowered manually, and in this case obviously there is no electric motorization assembly and the means for locking the windshield in raised configuration can be constituted by clamps or the like.

The windshield 1 has, in a lower region, at its sides, two curved symmetrical cutouts 21a, 21b which allow the appropriate rotation of the handlebar during steering when the windshield is fully raised: in an upward region, the windshield 1 can have two curved symmetrical cutouts 21c and 21d which allow the handlebar to turn when the windshield is fully lowered; the cutouts 21c and 21d are provided if the scooter is of the type having a rather low handlebar.

For safety reasons, the motorization assembly 17 is controlled by a switch that allows to operate the assembly only when the vehicle is not moving, since during the lifting operation the lateral bulk of the windshield interferes with the handlebar: in order to maintain the original steering angle, the two arms of the steering system are also swept back complementarily.

The operation of the windshield according to the invention is evident; the windshield is always kept with the scooter, and is stored in the compartment 4 when it is not being used; when it is to be used, the user activates the combined motor and reduction unit assembly 17 while the wheels of the vehicle are not moving, and said assembly raises the windshield until it reaches the fully raised configuration in which the cutouts 20a, 20b are at the level of the steering system.

Since in the active configuration the windshield is subjected to the action of the wind, which tends to make it tilt backwards, whereas it is not subjected to this stress in the inactive condition and during lifting and lowering, the lower regions of the profiles 9a and 9b and optionally the upper region of the rail 11 are stiffened; accordingly, in the upper region of the windshield the profiles 9a and 9b may be made of a material such as plastics and be optionally obtained by molding them monolithically with the windshield, whereas in the lower part it is convenient for them to be made of metal or of an equally strong material: in this intended embodiment, the bushes may be open at the front and assume a substantially C-shaped cross-section to clamp the profiles, as mentioned earlier.

It is possible to fix to the upper feet 10 a cross-member on which an electrically- or manually-operated windshield wiper can be mounted centrally; in this case said cross-member closes the compartment 4 at the top when the windshield is lowered.

It has thus been observed that the invention achieves the intended aim and object.

The invention thus conceived is susceptible of numerous modifications and variations, all of which are within the scope of the inventive concept; thus, for example, the lifting and lowering means can be manual, fluid-actuated, or other types, and the locking means can be constituted by clamps or other devices.

The dimensions of the guiding means, their spacing, the height and width of the windshield, the optional windshield reinforcement ribs, the tilt of the windshield and of the front fairing will be evaluated according to the type of frame and also to the speeds at which the scooter is meant to run.

All the details may furthermore be replaced with other technically equivalent ones.

In practice, the materials employed, as well as the shapes and dimensions, may be any according to the requirements without thereby abandoning the protective scope of the appended claims.

Examples of some details of alternative embodiments are shown in the drawings described hereafter.

Figure 9:
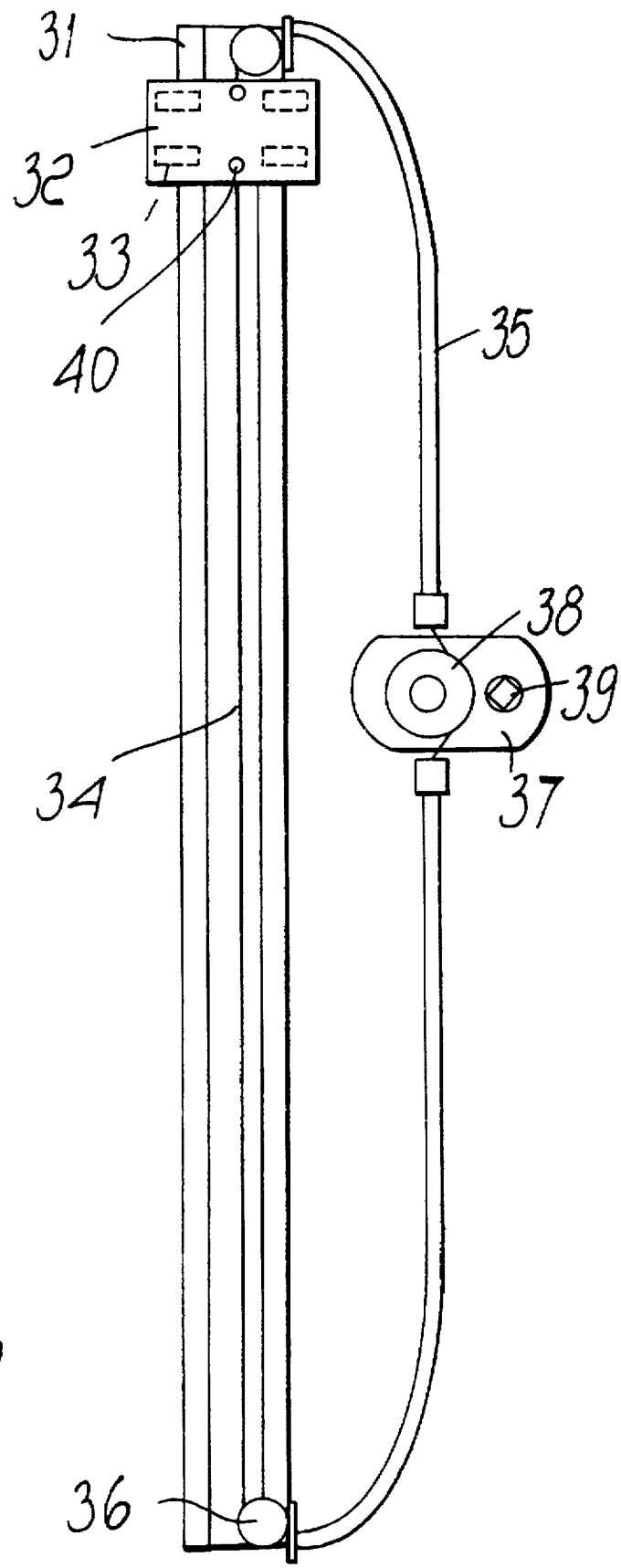
FIG. 9 shows an electric motorization assembly provided with a guided cable.

FIG. 9 shows an electric motorization assembly provided with a guided cable. The reference numeral 31 designates an omega-shaped guide which is formed on a bending press and is rigidly coupled to the sleeve of the fork of the scooter by means of a stamped-plate part and reinforcement stems; the reference numeral 32 designates a windshield supporting carriage; the reference numeral 33 designates sliding pads which are rigidly coupled to the carriage; the reference numeral 34 designates a cable made of braided steel wires; the reference numeral 35 designates a sliding sheath; the reference numeral 6 designates cable guiding wheels made of plastics; the reference numeral 37 designates a motor supporting element formed on a bending press; the reference numeral 38 designates a motion transmission wheel; the reference numeral 39 designates the coupling for an electric motor; the reference numeral 40 designates a cable locking device; the motor turns the wheel 38 on which the cable 34 is wound, and the cable 4 is anchored, at its two ends, to the carriage 32, which accordingly moves along the guide 31.

FIG. 10 shows a motorization assembly with caliper arms. The reference numeral 51 designates a profile formed on a bending press; the reference numeral 52 designates an oscillating arm; the reference numeral 53 designates a support for directional sliding pads made of antifriction material; the reference numeral 54 designates an omega-shaped guide formed on a bending press; the reference numeral 55 designates sliding pads; the reference numeral 56 designates a motion transmission ring; the reference numeral 57 designates a motor supporting block; the reference numeral 58 designates a coupling for a DC electric motor; the reference numeral 59 designates a return spring; the motor meshes with the ring 56, which drives in the desired direction the arm 52 that is rigidly coupled thereto; the arm 52 transmits the motion to the profile 51 and slides it along the guide 54.

FIG. 11 and 11a show a motorization assembly with female threads and a worm screw. The reference numeral 61 designates an omega-shaped guide; the reference numeral 62 designates a worm screw; the reference numeral 63 designates a female thread; the reference numeral 64 designates sliding pads made of antifriction plastics; the reference numeral 5 designates a pad supporting plate for anchoring the windshield; the reference numeral 66 designates a DC electric motor which is anchored to the omega-shaped guide and has a pinion that is keyed to the worm screw: the motor 66 and the guide 61 are rigidly coupled to the sleeve of the scooter by means of a structure formed on a bending press and of reinforcement stems: the motor 66 transmits its motion by means of the screw 62 to the female thread 63, lifting and lowering the windshield.

Figure 12A:
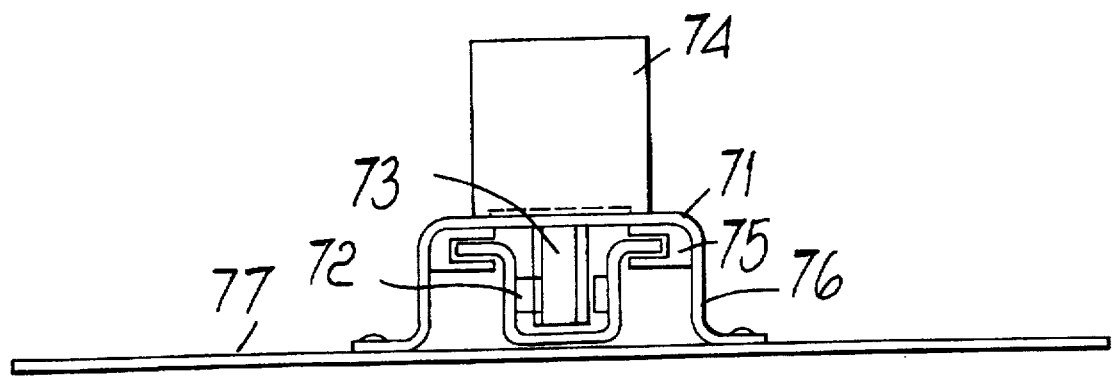
FIG. 12a is a top view of the assembly of FIG. 12.
Figure 12:
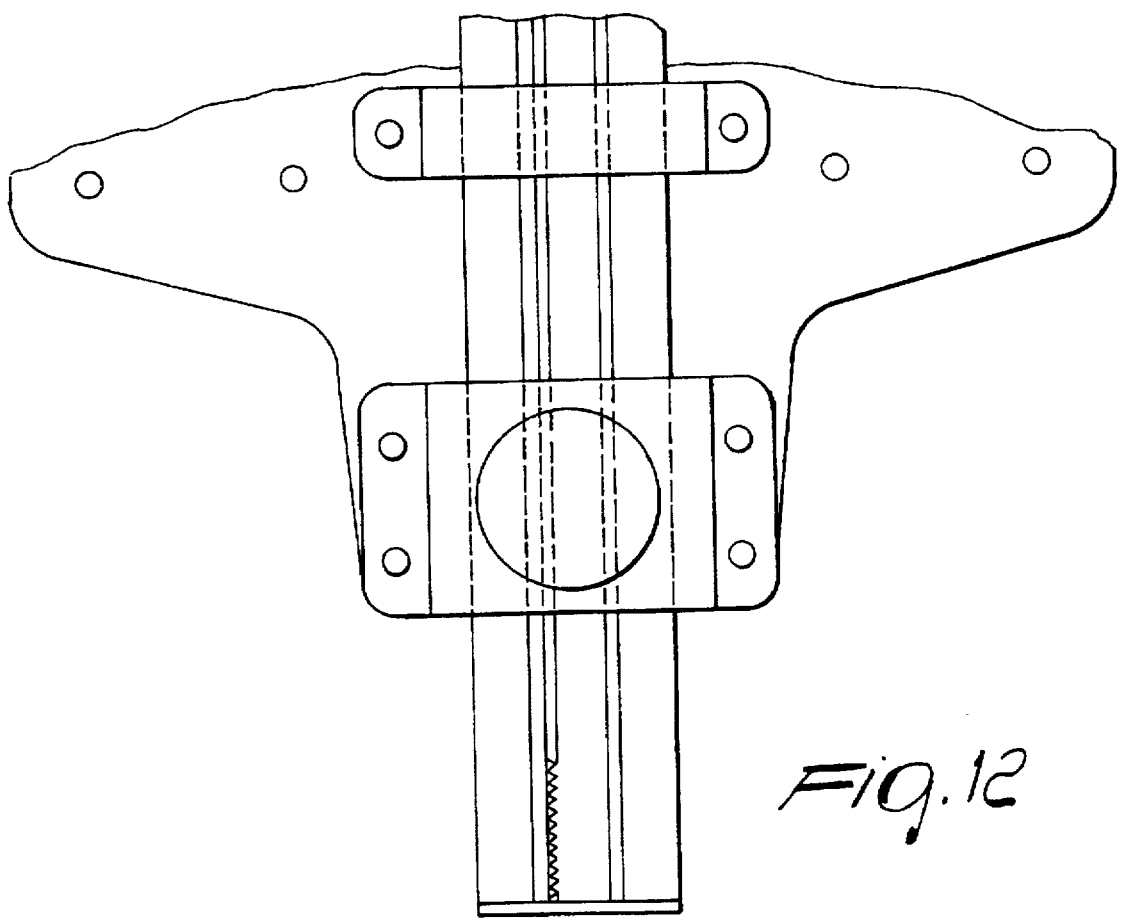
FIG. 12 shows is a front view a rack-based motorization assembly.
Figures 15, 15A:
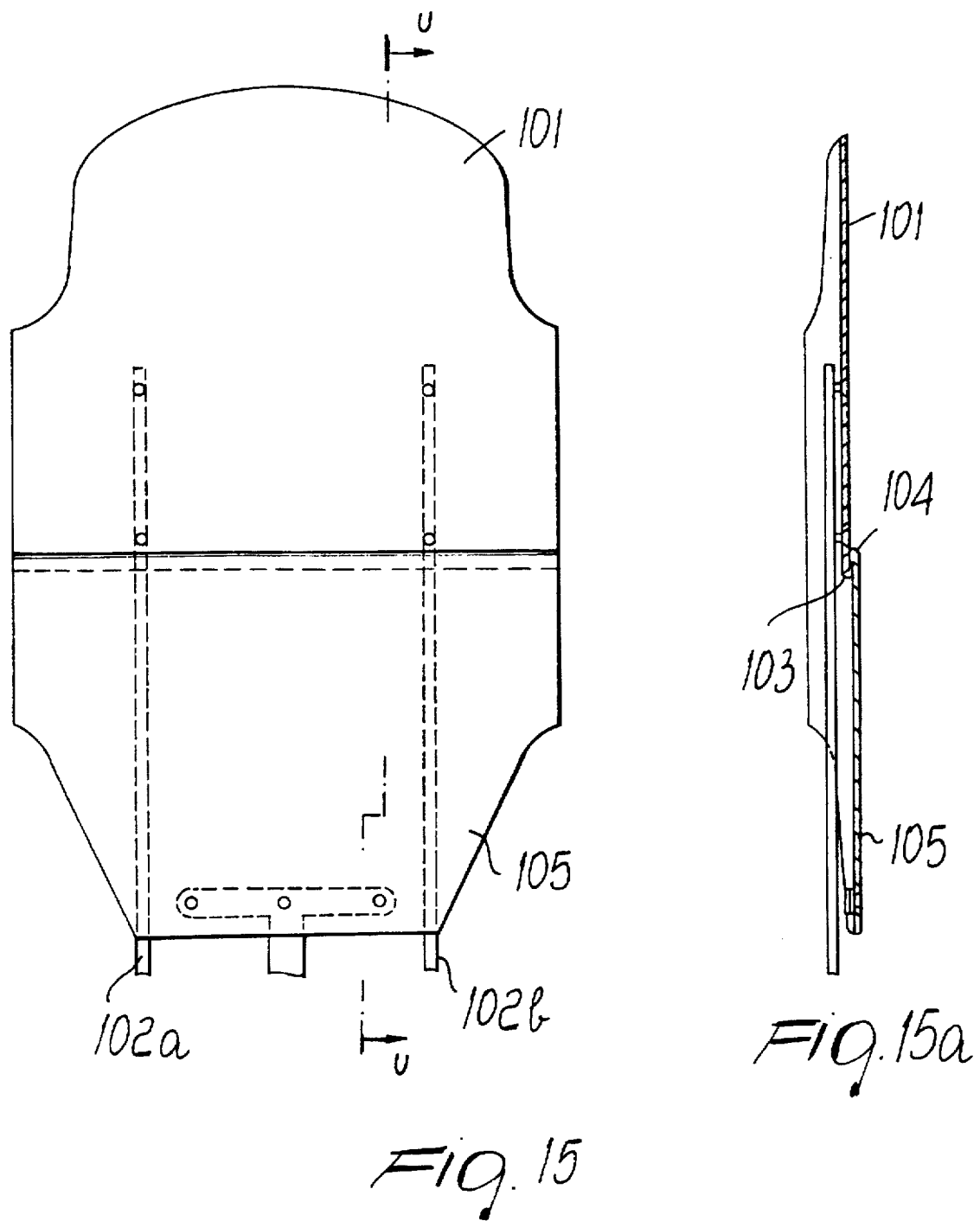
FIG. 15 is a front view of the windshield with vertical dimension reduction.
FIG. 15a is a sectional view taken along the plane U—U of FIG. 15.
Figure 16A:
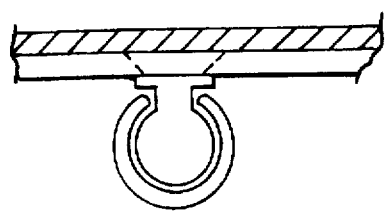
FIG. 16a is a sectional view taken along the plane G—G of FIG. 16.
Figure 16:
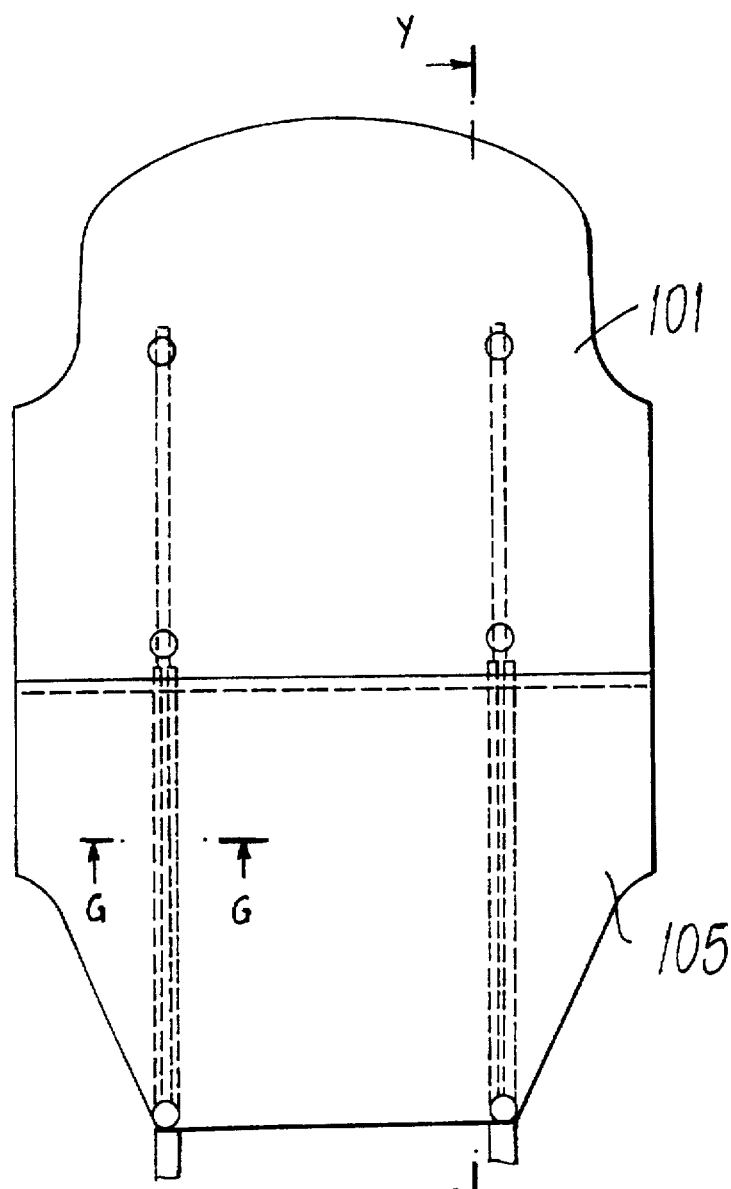
FIG. 16 is a front view of the windshield with telescopic supporting stems.
Figure 16B:
FIG. 16b is a sectional view taken along the plane Y—Y of FIG. 16.

FIG. 12 and 12a show a rack-based motorization assembly. The reference numeral 71 designates an omega-shaped guide; the reference numeral 72 designates a rack which is welded to the omega-shaped guide or made of antifriction plastics; the reference numeral 73 designates a pinion; the reference numeral 74 designates a DC electric motor; the reference numeral 75 designates sliding pads made of antifriction material; the reference numeral 76 designates a motor supporting plate and pads; the reference numeral 77 designates the coupling to the windshield; the guide 71 is rigidly coupled to the sleeve of the handlebar of the scooter by means of a plate formed on a bending press and of reinforcement stems: the motor is fixed to the plate 76, and as it turns it moves rigidly with the plate along the guide.

FIG. 13a and 13b show a safety system for limiting the steering angle if the windshield is so close to the handlebar as to prevent full steering. The reference numeral 81 designates an element which is rigidly coupled to the fork; the reference numeral 82 designates a supporting structure and frame; the reference numeral 83a designates an electromagnet in the configuration for allowing full steering; the reference numeral 83b designates the electromagnet in the configuration for limiting the steering action; the letter A designates the rotation axis of the handlebar; the electromagnet 83 is controlled by microswitches for limiting the upward and downward stroke of the windshield and by a device for detecting vehicle wheel motion, so that activation of the windshield is prevented when the vehicle is moving and so that steering is limited during the lifting and lowering of the windshield.

FIG. 14 and 14b show a windshield reinforced with a single central rib. The central rib 91 is obtained by molding monolithically with the windshield and can have a metal reinforcement core.

The rib 91 has a cross-section that allows sliding within the fixed central sliding guide.

The rib 91 accordingly acts as slider and as windshield reinforcement for existing mechanical stresses (wind, vibration, accelerations, etcetera).

In order to increase the strength of the structure when the windshield is raised, in its lower part the windshield is rigidly coupled to a plate made of metal (or of another appropriate material) which has two or more pins which are directed upwards and are suitable to enter, when lifting is complete, corresponding bushes which are provided with a frustum-shaped guiding flared portion that diverges downwardly and are rigidly fixed to the frame of the vehicle; this coupling thus prevents movements or vibrations of the windshield.

FIGS. 15, 15a, 16, 16a, and 16b show reduction of the vertical dimensions of the windshield.

The windshield is divided into two overlapping parts to reduce its bulk in the inactive configuration.

The upper half portion 101 is fixed to the two supporting stems 102a and 102b; the half-part 1 has, along its lower edge, a folded rear rim 103 which is suitable to couple in a corresponding complementary folded front rim 104 of the lower half-part 105 of the windshield: during the lifting of the half-part 101, the rim 103 is suitable to engage the rim 104 and also drag upwards the half-part 105 of the windshield.

In order to further reduce the vertical dimensions, telescopic stems (FIG. 16, 16a, 16b) are provided; in this case the half-part 101 is fixed to the narrower inner stem and the half-part 105 is fixed to the wider outer stem.

What is claimed is:

1. Retractable windshield in combination with a scooter comprising a front fairing and a fork and a sleeve for the fork, wherein an elongated compartment is formed between the front fairing and the sleeve of the fork of the scooter, the windshield being insertable in said compartment by sliding longitudinally, and wherein in front of the sleeve of the fork there are means for guiding and locking the windshield in a lowered inactive condition and in an active raised condition, and wherein said means for guiding the windshield comprise:

a pair of mutually spaced apart bushes fixed in a forward position to the sleeve of said fork;

a central rail rigidly coupled to the sleeve of said fork;

a pair of longitudinal profiles rigidly coupled to the windshield and each slidingly mounted in a respective one of said pair of bushes; and a carriage which is rigidly coupled to the windshield and slidingly supported on said central rail; and wherein said carriage is connected adjacent one end of the windshield and said longitudinal profiles are connected to the windshield so as to extend from said one end to an opposite end of the windshield, and wherein said central rail has an extension substantially as large as the extension of said longitudinal profiles.

2. Windshield according to claim 1, wherein said compartment and said windshield are substantially shaped like a longitudinally elongated sector of a cylinder.

3. Windshield according to claim 1, wherein said carriage is provided with means for sliding along the rail.

4. Windshield according to claim 1, wherein an electric motorization assembly for lifting and lowering the windshield is fixed in a forward region to said sleeve of the fork and is also suitable to act as means for locking the windshield in the raised or lowered condition.

5. Windshield according to claim 1, further comprising, in a downward region, two symmetrical lateral cutouts which allow appropriate turning of a handlebar of the scooter when the windshield is fully raised.

6. Windshield according to claim 1, further comprising, in an upward region, two lateral symmetrical cutouts which allow appropriate turning of a handlebar of the scooter when the windshield is fully lowered.

7. Windshield according to claim 4, wherein said motorization assembly is controlled by a safety switch which allows its actuation only when the vehicle is not moving.

8. Windshield according to claim 1, wherein a handlebar of the scooter is swept back complementarily to allow steering.

9. Windshield according to claim 1, wherein the windshield is divided into two overlapping parts to reduce bulk in the inactive configuration.

* * * * *